United States Patent [19]
Giachetti et al.

[11] Patent Number: 5,742,681
[45] Date of Patent: Apr. 21, 1998

[54] PROCESS FOR THE BROADCASTING OF PROGRAMMES WITH PROGRESSIVE CONDITIONAL ACCESS AND SEPARATION OF THE INFORMATION FLOW AND THE CORRESPONDING RECEIVER

[75] Inventors: Jean-Luc Giachetti, Betton; Louis Guillou, Bourgbaré ; Jean-Claude Pacaud, Cancale, all of France

[73] Assignees: France Telecom; Telediffusion de France, both of Paris, France

[21] Appl. No.: 415,987

[22] Filed: Apr. 4, 1995

[30] Foreign Application Priority Data

Apr. 6, 1994 [FR] France .................................. 94 04012

[51] Int. Cl.$^6$ .................................................. H04N 7/167
[52] U.S. Cl. .................... 380/20; 380/5; 380/49; 380/10
[58] Field of Search ....................... 380/20, 23, 4, 380/5, 49

[56] References Cited

U.S. PATENT DOCUMENTS 5,349,641  9/1994  Coutrot et al. ......................... 380/20
5,517,502  5/1996  Bestler et al. ......................... 370/94.2

FOREIGN PATENT DOCUMENTS 0 461 029  12/1991  European Pat. Off. .
0 583 202   2/1994  European Pat. Off. .

OTHER PUBLICATIONS

18th International Television Symposium and Technical Exhibition, Jun. 15, 1993, Montreux, Switzerland, pp. 761–769, may 10, 1993, Jean–Pierre Vigarie, "A Device for Real–Time Modification of Access Conditions in a D2–MAC/Packet Eurocrypt Signal: The Transcontroller".

IEEE Transactions on Consumer Electronics, vol. 38, No. 3, Aug. 1992, pp. 188–194, Didier Angebaud, et al., "Conditional Acess Mechanisms for All–Digital Broadcast Signals".

*Primary Examiner*—David C. Cain
*Attorney, Agent, or Firm*—Oblon, Spivak, McClelland, Maier & Neustadt, P.C.

[57] ABSTRACT

Process for the broadcasting of programmes with progressive conditional access and separation of the information flow, as well as the corresponding receiver, In order to form the elementary flow, groups of m successive elements of the multiplex are taken and for forming the complimentary flow groups of p successive elements of the multiplex are taken.

Application to television with entitlement checking.

20 Claims, 4 Drawing Sheets

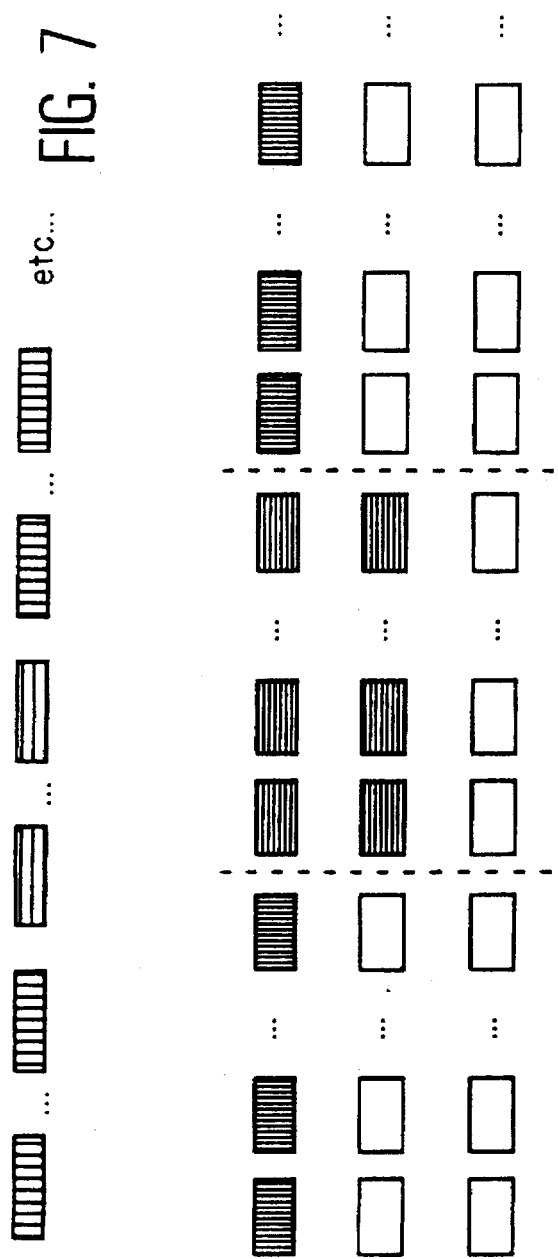
FIG. 7
FIG. 8
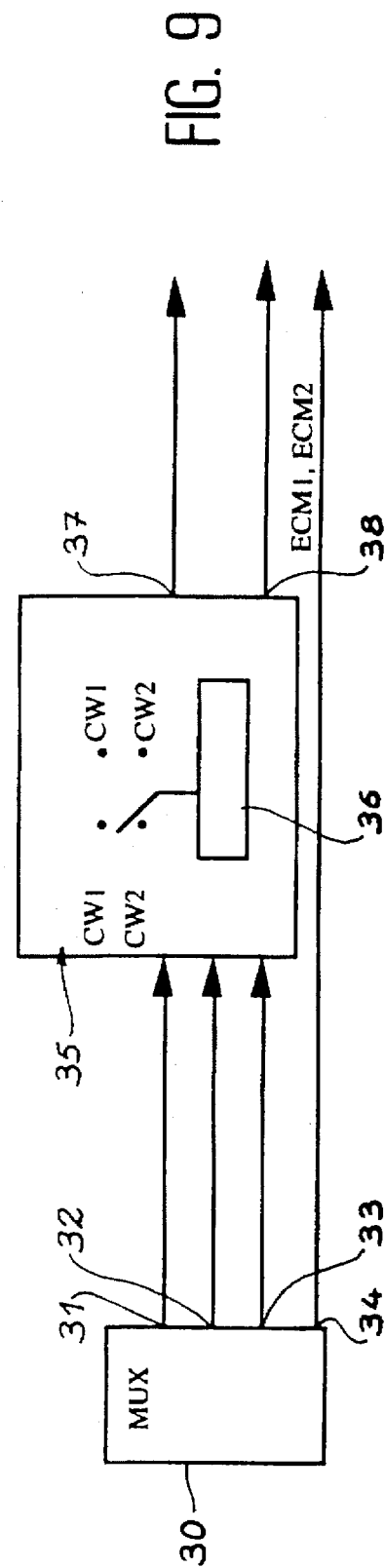
FIG. 9

PROCESS FOR THE BROADCASTING OF PROGRAMMES WITH PROGRESSIVE CONDITIONAL ACCESS AND SEPARATION OF THE INFORMATION FLOW AND THE CORRESPONDING RECEIVER

TECHNICAL FIELD

The present invention relates to a process for the broadcasting of programmes having a progressive access and separation of the information flow, as well as the corresponding receiver.

It is used in pay television, in the broadcasting of radio, sound or data programmes, in the transmission and distribution of programme elements, etc.

PRIOR ART

In conventional programme broadcasting systems, access to the programmes is reserved for a certain population of receivers. Although it is possible to distinguish between different access rights (e,g. a programme can be simultaneously accessible by subscription and impulse buying), it remains that a receiver is or is not authorized as a function of whether it does or does not have a certain access right.

However, the possibility of attracting the television viewer or listener by voluntarily discovering all or part of the content of the picture or sound of a programme during a given time period is an important commercial advantage for any conditional access system. This function exists at present on certain pay television systems using a scrambling process which does not deeply transform the picture. However, digitally, the currently used scrambling methods excessively transform the signal to enable the user to "guess" the programme.

French patent application 92 15841 filed on Dec. 29 1992 and entitled "Process for broadcasting conditional access programmes permitting a progressive access to such programmes" or the corresponding U.S. application Ser. No. 08/172,817 of Dec. 27 1993 describes a method making it possible to have a "glimpse" of certain programmes. This glimpse is made possible by the use of an access right of an only partial nature, unlike in the case of the total, standard access right. Thus, apart from authorized receivers, which can completely access a programme and unauthorized receivers, which cannot receive anything of said programme, according to this procedure, there are other receivers which can have a glimpse of the programme, i.e. being able to access a discernible, but non-usable form of the programme.

The process described in the aforementioned patent application has the following operations:

informations individual to various programmes are scrambled, the thus scrambled informations are transmitted for each programme, in synchronized manner with the programme, transmission takes place of entitlement checking messages individual to each of these programmes, said messages being able to permit descrambling and restoration of the programmes in receivers having the corresponding access or entitlement rights, transmission also takes place of partial entitlement checking messages to at least certain of these programmes, said partial entitlement checking messages being able to permit the descrambling and partial restoration of the corresponding programmes for receivers having a partial access or entitlement right.

Advantageously, for performing this process, the information flow corresponding to each programme is broken down into a first, so-called elementary flow, corresponding to a programme which, once restored in a receiver, will be discernible without being directly usable, and a second, so-called complimentary flow making it possible to complete the first flow, in order to permit the complete restoration of the programme. In this variant, the partial entitlement checking messages apply to the elementary flows.

The technical problem which the present invention aims at solving is the production of the elementary flow and the complimentary flow required in said process and this takes place from a single flow leaving a random coder.

DESCRIPTION OF THE INVENTION

Thus, the present invention more particularly relates to the transmission process for programmes with progressive conditional access, namely the stage of forming the elementary and complimentary flows. The invention applies in the case where the information flow leaving the coder is of the digital type, because it is in this case that the most difficult problems occur for progressive conditional access. It is also assumed that the informations are multiplex, i.e. they constitute a "multiplex" formed by a sequence of elements which can be, according to the nature of the multiplexing, frames, packets, etc.

Under these conditions and according to the invention, in order to subdivide the multiplex information flow into an elementary flow and a complimentary flow, alternately groups of m successive elements and p successive elements of the multiplex are taken, the groups of m elements constituting the elementary flow and the groups of p elements the complimentary flow.

Thus, more specifically, the present invention relates to a process for the broadcasting of programmes with progressive conditional access, in which:

an information flow corresponding to one component of a programme is broken down into a first or elementary flow and into a second or complimentary flow, at least the complimentary flow is scrambled with the aid of a control or check word, in synchronous manner with each programme, transmission takes place of entitlement checking messages making it possible to descramble and restore the scrambled flows in receivers having the corresponding access or entitlement rights, the restoration of the elementary flow alone leading to a programme component which is discernible without being directly usable and the descrambling of the complimentary flow making it possible to complete the component of the programme in order to permit complete programme restoration, said process being characterized in that, the information flow being in the form of a digital multiplex constituted by a sequence of elements, the elementary flow is formed by taking said multiplex groups of m successive elements and the complimentary flow is formed by taking in the multiplex groups of p successive elements, the groups of m successive elements alternating with the groups of p successive elements.

In a first embodiment, the elements of the multiplex are fixed length frames, broken down into variable length channels, the component of the programme to be scrambled being transmitted in a channel of a given order, the elementary flow then being formed by taking the informations contained in a channel of a given order i in groups of m successive frames and the complimentary flow by the informations contained in the channel of the same given order i in groups of p successive frames alternating with said groups of m successive frames.

In a first variant, scrambling takes place of the channel of given rank i of groups of m successive frames by a first control word CW1 and the channel of the same order i of groups of p successive frames by a second control word CW2.

The control word CW1 can be the known, local control word of the receiver or a control word conveyed within an entitlement checking message.

In another variant, scrambling does not take place of the channel of given order i of the groups of m successive frames and instead scrambling takes place of the channel of given order i of the groups of p successive frames by a control word (CW2).

In a second embodiment, the elements of the multiplex are packets and the elementary flow is formed by the informations contained in the groups of m successive packets and the complimentary flow by informations contained in groups of p successive packets alternating with the groups of m successive packets.

In a first variant, scrambling takes place of the packets of the groups of m successive packets by a first control word CW1 and the packets of the groups of p successive packets by a second control word CW2.

In a second variant, scrambling does not take place of the packets of the groups of m successive packets and instead scrambling takes place of the packets of the groups of p successive packets by a control word (CW2).

The present invention also relates to a receiver able to receive the programmes transmitted according to the process defined hereinbefore. This receiver is characterized in that it incorporates:

- means for subdividing in the information flow received a first or elementary flow constituted by groups of m successive elements and a second or complimentary flow constituted by groups of p successive elements, the groups of m successive elements alternating with the groups of p successive elements,
- means for recognizing at least one entitlement checking message in the informations received and for extracting therefrom at least one control word and at least one access condition,
- means for checking if at least said access condition is satisfied,
- means for descrambling at least the complimentary flow with the aid of the associated control word if the corresponding access condition is satisfied,
- at least one video, audio or data receiver receiving at least the signals of the elementary flow and, if appropriate, the signals of the descrambled complimentary flow if the corresponding access condition is satisfied.

BRIEF DESCRIPTION OF THE DRAWINGS

FIG. 7 illustrates the constitution of the elementary flow and the complimentary flow in the case of a packet multiplex.

FIG. 8 shows the respectively scrambled, degrade and descrambled components in the preceding case.

FIG. 9 illustrates the means making it possible to perform the process of the invention in the case of packet multiplexing.

DETAILED DESCRIPTION OF EMBODIMENTS OF THE INVENTION

Figure 1:
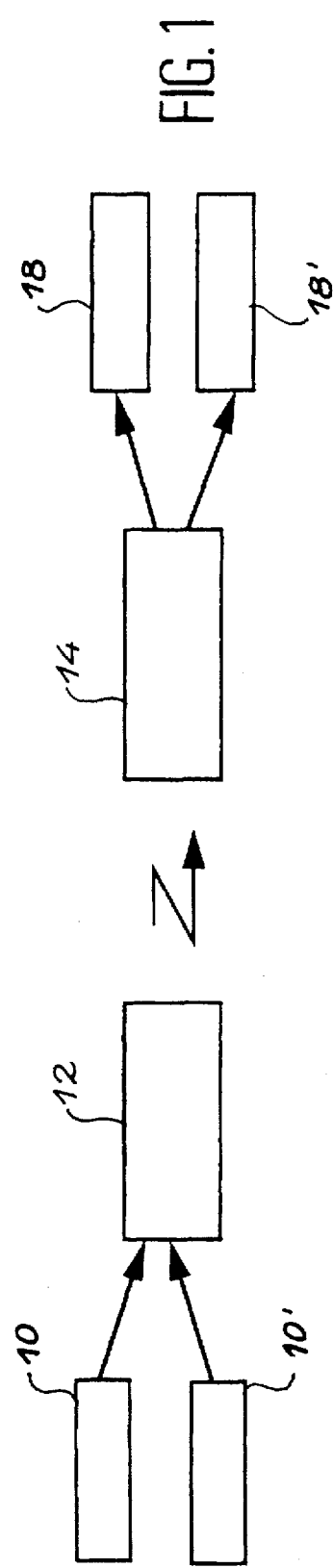
FIG. 1 is a diagram showing a pay television broadcasting network

FIG. 1 shows a conventional pay television programme broadcasting network or link having, on the transmission side, source coders in the form of two coders 10, 10', a multiplexer/scrambler 12 and, on the reception side, a demultiplexer/descrambler 14 and source decoders in the form of the two decoders 18, 18'.

The information flows from the source coders 10, 10' supply the multiplexer/scrambler 12, which multiplexes and scrambles said flows in order to supply a single flow constituting the broadcast flow.

Scrambling is a reversible operation for transforming the signal transmitted with the aid of a key called a check or control word (CW), in order to make said programme unintelligible for users not having said control word.

In order to permit descrambling, the control word is transmitted in encrypted form in entitlement checking messages (ECM). Each ECM also contains the access condition (EC) to be satisfied by the access control module of the user in order to permit the decrypting of the control word CW and consequently the descrambling of the signal.

The control words have a limited life of typically 10 seconds. In order to avoid any problem during control word changes, the respectively current and future control words are transmitted in the entitlement checking message, one being the even control word used during an even phase and designated $CW_e$, whilst the other is the odd control word CW used during an odd phase.

The information flows from the source coders are time multiplexed. Two methods are mainly used in the field of digital broadcasting, namely frame multiplexing and packet multiplexing.

Figure 2:
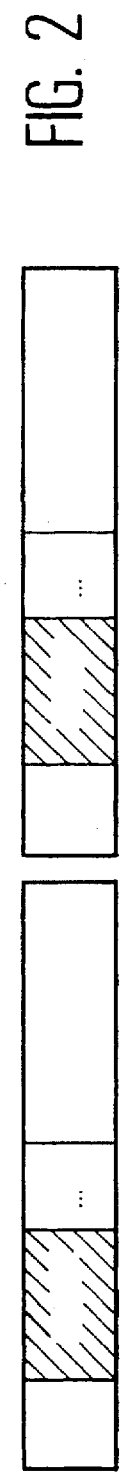
FIG. 2 is a diagram showing the organization of a multiplex according to the frame multiplexing method.

In frame multiplexing, the multiplex is constituted by a succession of frames of fixed length all having the same organization, as indicated in the diagram of FIG. 2, which shows a frame of order i and the following frame of order i+1.

A frame is broken down into n variable length channels. Each channel conveys an elementary flow (video, sound, etc.). The same breakdown is used for all the frames (multiplex reconfigurations are possible, but rare). The flow rate allocated to a channel of order k is equal to (Lgk)/Tbits/s, in which Lgk is the length of the channel k in bits and T the period of the frame.

In exemplified manner, reference can be made to the STERNE multiplex, which is a frame multiplex The length of a frame is 24 ms. The flow rate allocated to a channel which would have a length of 1 byte would be equal to approximately 333 bits/s.

In general, one channel is reserved for conveying a service link describing all the other channels of the frame: channel length, description of the elementary flow conveyed in the channel, scrambling and access control parameters, etc.

The service link also conveys a frame counter e.g. used for fixing the life of the control words and the parity of the phase.

At present, the scrambling of an elementary flow takes place by scrambling, in all the frames, all the bits of the channel conveying the elementary flow. In FIG. 2, the scrambling relates to channel 2 and is symbolized by hatching.

Figure 3:
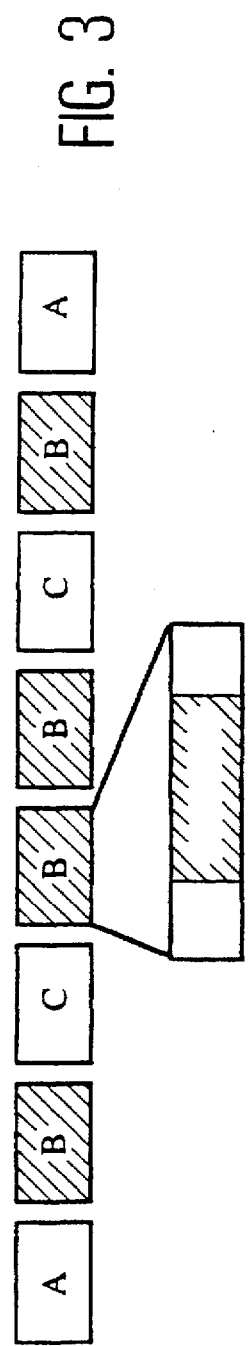
FIG. 3 is a diagram showing the organization of a multiplex according to the packet multiplexing method.

Packet multiplexing consists of producing a succession of fixed or variable length packets. Each packet contains the data of an elementary flow. The diagram of FIG. 3 gives an example of packet multiplex, conveying three elementary flows A, B and C. Each packet is constituted by a header (E-T), a data field and a suffix (Sfx).

At present, the scrambling of an elementary flow takes place by scrambling all the data fields of packets conveying said elementary flow. In the example illustrated in FIG. 3, only the elementary flow B is scrambled (the hatching symbolizing scrambling).

In exemplified manner, the multiplex MPEG2 is a packet multiplex in which the packets all have a fixed length of 188 bytes. The header contains an identifier of the elementary flow, plus two bits defining the scrambling parameters and method used for this packet. The values of these two bits are at present standardized:

00: no scrambling

01: reserve

10: scrambling with the even control word

11: scrambling with the odd control word.

In the aforementioned patent application 92 15841 (U.S. Ser. No. 08/172,817), a description is given as to how a progressive scrambling mechanism can be implemented in the case where the video or audio component is in two discernible flows. In this case, it is sufficient to apply a control word CW1 (associated with an access condition CA1) to the elementary flow and a control word CW2 (associated with an access condition CA2) to the complimentary flow. The access condition CA1 and the cryptogramme (cipher text) of CW1 are conveyed in an entitlement checking message ECM1. The access condition CA2 and the cryptogramme of CW2 are conveyed in an entitlement checking message ECM2. The access condition CA1 alone permits the descrambling of the elementary flow, thus supplying a picture or sound in degraded, but comprehensible form for the user.

A description will now be given as to how it is possible to produce two discernible flows, respectively scrambled with the control word CW1 and CW2, in the case of a frame multiplex and a packet multiplex.

Figure 4:
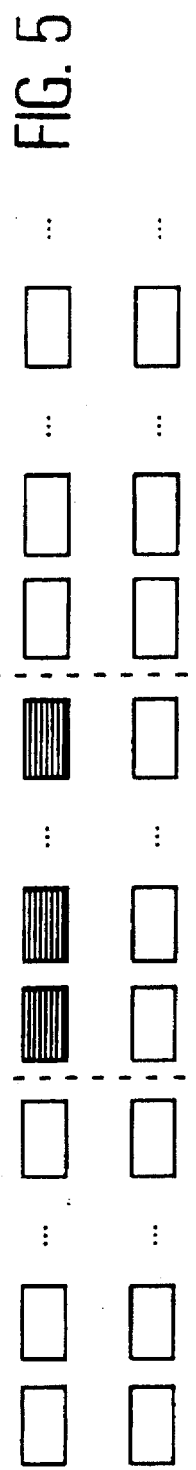
FIG. 4 illustrates the constitution of the elementary flow and the complimentary flow in the case of a frame multiplex

In the case of the frame multiplex, the component to which it is wished to apply the progressive scrambling is transmitted in channel i of each frame. The process of the invention then consists of scrambling the channel i of m successive frames with the word CW1 and then the same channel of p successive frames with CW2, followed by the same channel of m successive frames with CW1, etc., as indicated in FIG. 4, where the vertical lines symbolize a scrambling with CW1 and the horizontal lines a scrambling with CW2. The words CW1 and CW2 change parity at the same time. This parity is not indicated in the diagram of FIG. 4.

The values of the quantities m and p, individual to each of the scrambled channels must be known by the decoder in implicit or explicit manner. In the latter case, they are transmitted in the service link, accompanied by a synchronization information (e.g. a particular value of the frame counter) indicating at which frame the scrambling commences with CW1 or CW2.

On reception, the elementary flow is obtained by descrambling the frames scrambled with CW1. The complimentary flow is obtained by descrambling the frames scrambled with CW2. The delivery to the video or audio decoder of a single elementary flow gives a picture or a sound in degraded form. The delivery to the video or audio decoder of the elementary flow accompanied by the complimentary flow gives a top quality picture or sound.

Figure 5:
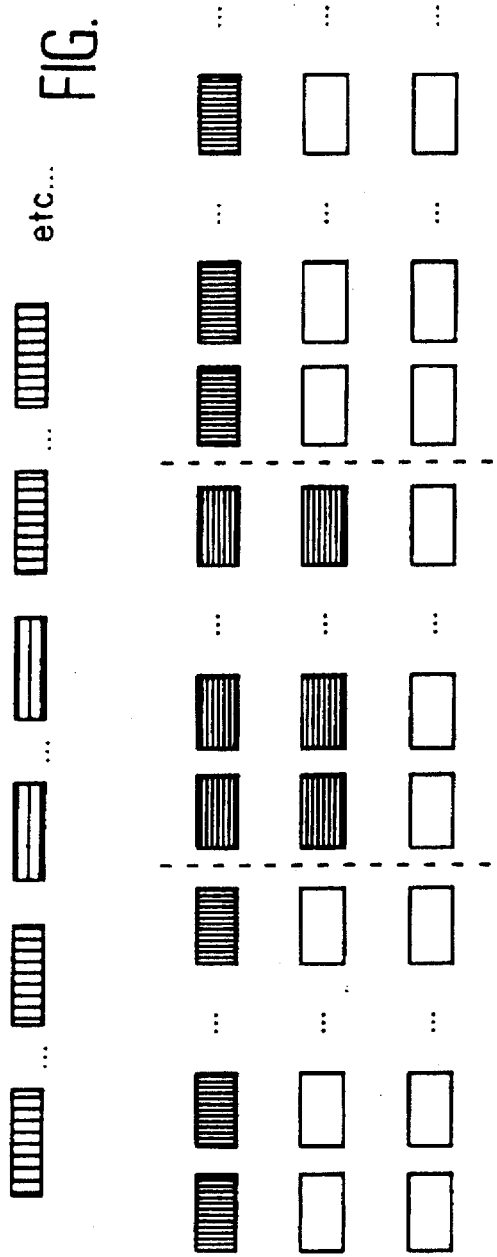
FIG. 5 shows the respectively scrambled, degraded and descrambled components in the preceding case

FIG. 5 shows on the first line the scrambled component and on the second line the degraded component when only the elementary flow has been descrambled and on the third line the completely descrambled component.

The choice of the quantities m and p must be fixed as a function of the performance characteristics of the video or audio decoder and in particular as a function of its lock-in time. In general, m is well above p, because very few scrambled frames are required in order to greatly disturb the behaviour of the video or audio decoder.

Figure 6:
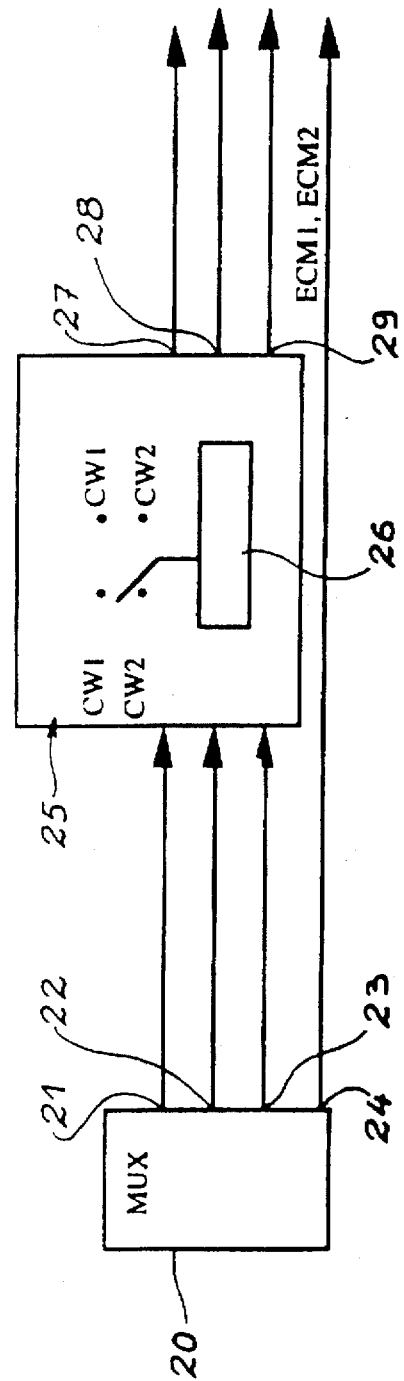
FIG. 6 illustrates the means making it possible to perform the process of the invention in the case of frame multiplexing.

The means used on transmission are shown in FIG. 6. They comprise a multiplexer 20 with a first output 21 supplying uncoded data, a second output supplying the frame synchronization, a third output supplying the quantities m and p, as well as the frame counter and the parity, and finally a fourth output 24 supplying two entitlement checking messages ECM1, ECM2.

The means also comprise a circuit 25 containing the control words used (CW1 even and odd and CW2 even and odd) and the scrambler 26, which uses one or other of these words. The circuit 25 supplies on a first output 27 the scrambled data, on a second output 28 the frame synchronization and on a third output 29 the quantities m and p, as well as the frame counter and parity.

As it is now a question of packet multiplex, the case is close to that of the frame multiplex, the difference being based on the transmission of the synchronization informations between the scrambler and the descrambler. Thus, in the case of the packet multiplex, the packet header can be used for conveying the information. It is in the packet header which will be supplied the scrambling information with CW1 or CW2, as well as the parity, This more particularly makes it possible for the scrambler to vary the values of m and p.

For example, the quantity m can correspond to the number of packets necessary for encoding an intra picture, whereas p can correspond to the number of packets between two intra pictures.

It is pointed out that the scrambling of the elementary flow with the control word CW1 is not obligatory. In a simplified variant, the channel of order i of groups of m successive frames is not scrambled and scrambling only takes place of the channel of order i of groups of p successive frames and this takes place with the control word CW2. Thus, no definition takes place of the access conditions CA1 and the control word CW1 is not used. This amounts to exerting no control on the reception of the elementary flow and to offering all receivers access to the picture or sound in degraded form.

It is also pointed out that, as hereinbefore, the control word CW1 can be a known, local control word of the receiver or a control word conveyed within an entitlement checking message.

FIG. 7 shows how the elementary flow is formed with groups of m packets, which will be scrambled with the first control word CW1 and groups of p packets, which will be scrambled with the second control word CW2. The vertical lines symbolize the scrambling with CW1 and the horizontal lines the scrambling with CW2.

On reception, the elementary flow will be obtained by descrambling the packets scrambled with CW1. The complimentary flow will be obtained by descrambling the packets scrambled with CW2. The delivery to the video or audio decoder of an elementary flow only will give a degraded sound or picture. The delivery to the video or audio decoder of the elementary flow accompanied by the complimentary flow will give a top quality picture or sound.

FIG. 8 shows on the first line the scrambled component, on the second line the degraded component corresponding to the descrambled elementary flow only, and on the third line the completely descrambled component (elementary and complimentary flows).

Here again, the choice of m and p must be fixed as a function of the performance characteristics of the video or audio decoder and in particular as a function of its lock-in time. Generally, m greatly exceeds p, because very few scrambled packets are required for greatly disturbing the behaviour of the video or audio decoder.

FIG. 9 diagrammatically shows the means used on transmission, in the packet multiplexing variant. These means comprise a multiplexer 30 supplying on a first output 31 the uncoded packets, on a second output 32 the packet synchronization, on a third output 33 the quantities m and p, as well as the parity and on a fourth output 34 the entitlement checking messages ECM1, ECM2.

These means also comprise a circuit 35 containing the even and odd control words CW1 and the even and odd control words CW2 and the scrambler 36 using said words. The circuit 35 supplies on a first output 37 the scrambled packets and on a second output 38 a parity signal.

In both packet and frame multiplexing, a particular implementation of the present process consists of not defining an access condition CA1 and not using the control word CW1. This amounts to exerting no control on the reception of the elementary flow and offering all receivers access to the degraded picture or sound. It is also possible to use as the control word CW1, the known, local control word of the receiver or a control word conveyed within an entitlement checking message.

Finally, it is possible to define a manner of implementing the process of the invention in the case of so-called MPEG2 multiplexing. In the particular case of MPEG2, the indication for the scrambling in the header of each packet is constituted by two bits called "Transport-Scrambling-Control" (TSC) in the draft standard MPEG2 system (ISO/IEC CD 13818-1). The values of these two bits are at present standardized:

00: the packet is not scrambled
01: is reserved
10: the packet is scrambled with the even control word
11: the packet is scrambled with the odd control word.

In order to implement the process described hereinbefore, it is necessary to be able to indicate to the decoder no longer two control words (even or odd) but in all four control words (CW1 even, CW2 even, CW1 odd, CW2 odd). It must be able to indicate which of these four control words has been used for scrambling the data field of the packet and for this purpose it is possible to use the value "01", which is at present reserved.

The behaviour of the decoder is then as follows (the behaviour of the coder being easily deduced therefrom). It is assumed that the decoder has a parity memory (1 bit sufficient) called MEM-PAR:

initial state: MEM-PAR=0 or 1 reception of a packet with TSC="00": no descrambling action to take place reception of a packet with TSC="10": descrambling of the packet with CW2 even and MEM-PAR→0 (i.e. storing the value "0" in MEM-PAR)

reception of a packet with TSC="11": descrambling of the packet with CW2 odd and MEM-PAR→1 (i.e. storing the value "1" in MEM-PAR)

reception of a packet with TSC="01": descrambling of the packet with CW1 even if MEM-PAR=0 or with CW1 odd if MEM-PAR=1.

On connecting the receiver, the content of the parity memory MEM-PAR has a ½ probability of being erroneous up to the reception of the first packet with TSC="10" or "11". The maximum waiting time before being perfectly synchronized is m packets. It is therefore necessary in the implementation of this variant to ensure that this time delay is not perceptible for the user (lowest possible value of m).

It is pointed out that the particular case of implementing the process consisting of not defining the access condition CA1 and not using the control word CW1 can easily be brought about by using the value TSC="00" instead of TSC="01".

The decoder solely having access to the degraded picture can operate according to several modes:

supply to the video decoder the descrambled pictures, as well as the pictures remaining scrambled, deliver to the video decoder only the descrambled pictures and the video decoder freezes the last picture received during the reception of the scrambled pictures.

Figure 10:
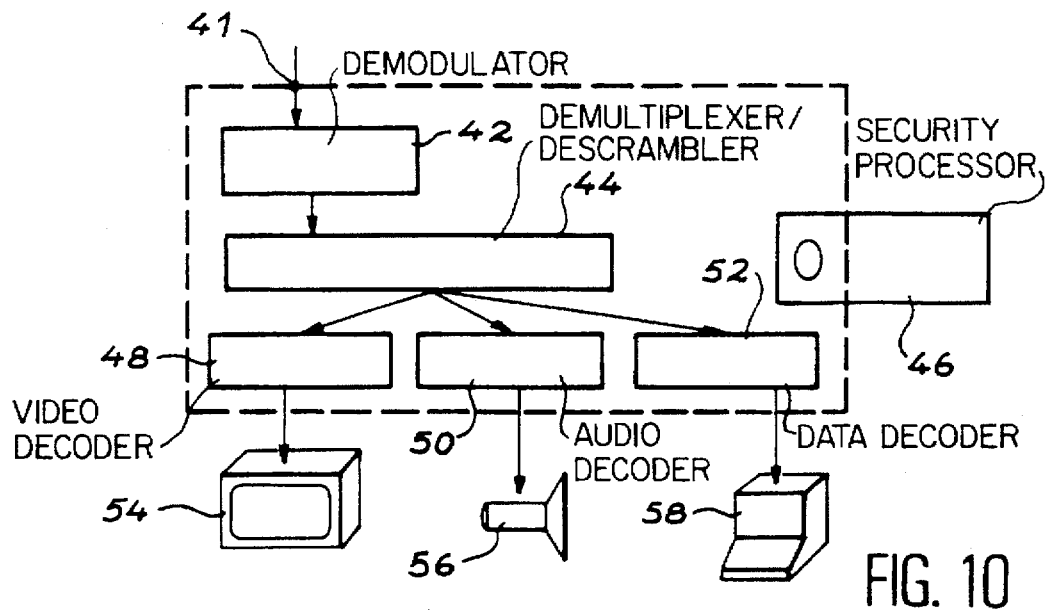
FIG. 10 shows the block diagram of a receiver able to process signals broadcast according to the process of the invention.

FIG. 10 diagrammatically illustrates a receiver able to receive the programmes transmitted in accordance with the process which has been described. In FIG. 10 the receiver carries the general reference 40. This receiver has a general input 41, a demodulator 42, a demultiplexer/descrambler 44, a security processor 46, video decoder 48, an audio decoder 50, a data decoder 52, a display screen 54, a loudspeaker 56 and a personal computer 58.

The signal received on the input 41 is firstly demodulated in the circuit 42 and is then supplied to the demultiplexer/descrambler 44, which extracts the frames or packets of the selected component and descrambles them if the user has the requisite access rights, The signal is then supplied to the video decoder 48 in the case of a video signal, to the audio decoder 50 in the case of an audio signal, or to a data decoder 52 in the case of a data signal. Once the signal has been decoded, it is supplied to the user on the appropriate support, namely screen 54 for video, loudspeaker 56 for audio and computer 58 for data.

Figure 11:
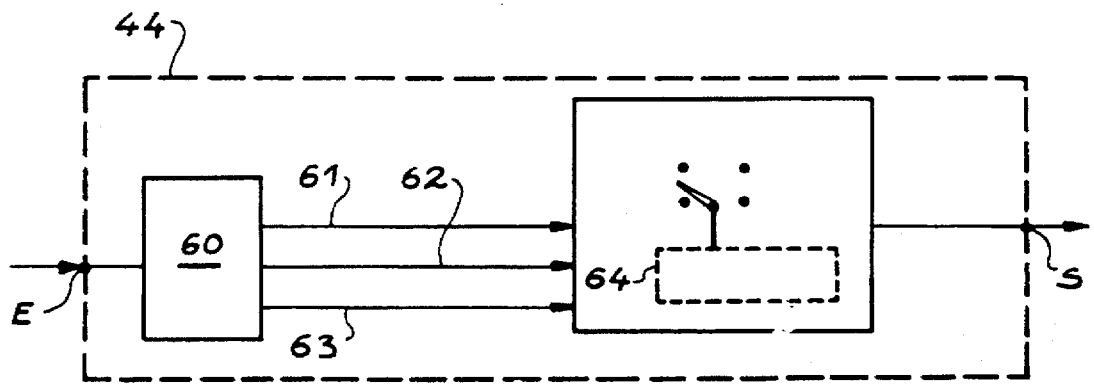
FIG. 11 illustrates the operation of the demultiplexer-descrambler in the case of a frame multiplex.

In the case of a frame multiplex, the demultiplexer/descrambler 44 is organized in accordance with FIG. 11. The general input E is connected to a frame demultiplexer 60 having three outputs respectively 61 for the scrambled data, 62 for the frame synchronization and 63 for the quantities m and p, the frame counter and parity.

The descrambler 64 either receives even control words CW1, CW2, or odd control words CW1, CW2 according to the parity and descrambles the signals. The uncoded signals are available on the output S.

The demultiplexer/descrambler analyzes the service link in order to restore there (if it does not know them in implicit manner) the values of m, p and the synchronization information indicating at what frame the scrambling commences with CW1 or CW2.

The demultiplexer/descrambler restores ECM1 and ECM2. It supplies said ECM to the security processor of the decoder (often a microprocessor card) for checking the access conditions CA1 and CA2 and calculating the control word CW1 and CW2 if the access conditions are respected. If the user satisfies neither CA1 nor CA2, the component remains entirely scrambled.

If the user satisfies the access condition CA1, but not the access condition CA2, he has access to a picture or a sound or data in degraded form. The demultiplexer/descrambler descrambles bursts of m frames scrambled with CW1. He thus produces a flow constituted by m uncoded frames, then p coded frames, then again m uncoded frames, etc. This flow is supplied to the video or audio or data decoder.

If the component is an audio component, the audio decoder can decode everything (the decoding of the scrambled frames leading to noise on the loudspeaker) or can decide not to decode the bursts of p frames remaining scrambled (no sound on the loudspeaker during the passage of these frames).

If the component is a video component, the video decoder can decode everything (the decoding of the scrambled frames leading to a noisy picture on the screen) or can decide not to decode the bursts of p frames remaining scrambled and freeze on the screen during this time the last correctly decoded picture.

If the user satisfies the access conditions CA1 and CA2, he has access to a picture or a sound or data in completely descrambled form.

The demultiplexer/descrambler descrambles the bursts of frames scrambled with CW1 and the bursts of p frames scrambles with CW2. He thus produces a flow constituted by completely descrambled frames and this flow is supplied to the video or audio or data decoder.

A particular case consists of not defining the access condition CA1 and not using the control word CW1 (the bursts of m frames are uncoded). This amounts to exerting no control on the reception of the elementary flow and offering all receivers access to the degraded sound or picture.

Figure 12:
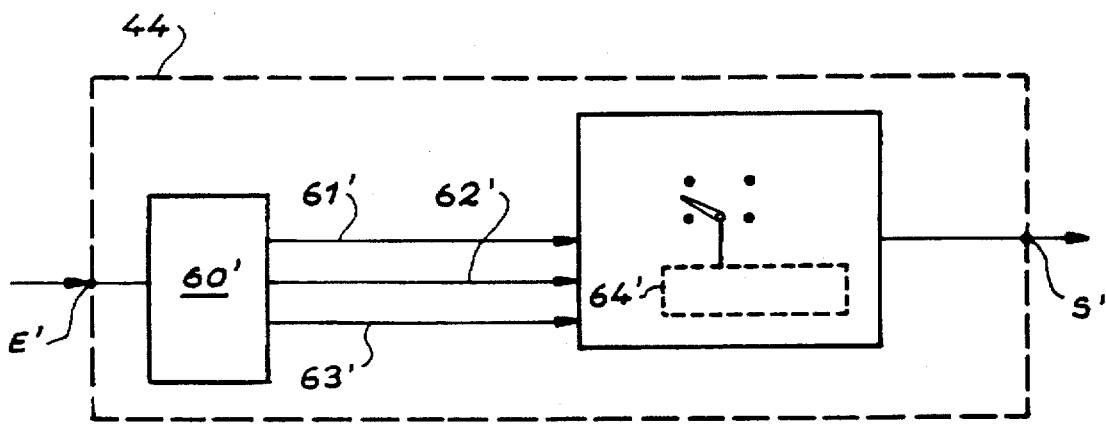
FIG. 12 illustrates the operation of the demultiplexer-descrambler in the case of a packet multiplex.

In the case of a packet multiplex, the demultiplexer/descrambler 44 is organized according to FIG. 12. The input E' is connected to a packet demultiplexer 60' having three outputs, respectively 61' supplying the scrambled packets, 62' for packet synchronization and 63' for the quantities m and p and for parity.

The descrambler 64' receives either the even control word CW1 or CW2, or the odd control word CW1, CW2, according to the parity, and descrambles the signals. The uncoded signals are available on the output S'.

The demultiplexer/descrambler restores ECM1 and ECM2 and supplies them to the security processor of the decoder (often a microprocessor card) for checking the access conditions CA1 and CA2 and calculating the control word CW1, CW2 if the access conditions are respected. If the user satisfies neither CA1 nor CA2, the component remains entirely scrambled.

The demultiplexer/descrambler analyzes the header of the packets in order to know with which CW he must descramble the packet (CW1 even, CW1 odd, CW2 even, CW2 odd).

If the user satisfies access condition CA1, but not access condition CA2, he has access to a picture, or sound or data in degraded form in accordance with the mechanism indicated below.

The demultiplexer/descrambler descrambles the bursts of n packets scrambled with CW1. It thus produces a flow constituted by m uncoded packets, then p scrambled packets, then again m uncoded packets, etc. This flow is supplied to the video or audio or data decoder.

If the component is an audio component, the audio decoder can decode everything (the decoding of the scrambled packets leading to noise on the loudspeaker) or may decide not to decode the bursts of p packets remaining scrambled (no sound on the loudspeaker during the passage of these packets).

If the component is a video component, the video decoder can decode everything (the decoding of the scrambled packets leading to a noisy picture on the screen) or may decide not to decode the bursts of p packets remaining scrambled and freeze on the screen during this time the final correctly decoded picture.

If the user satisfies the access conditions CA1 and CA2, he has access to a picture, sound or data in completely descrambled form.

The demultiplexer/descrambler descrambles the bursts of packets scrambled with CW1 and the bursts of packets scrambled with CW2. He thus produces a flow constituted by completely descrambled packets. This flow is supplied to the video, audio or data decoder.

A particular implementation case consists of not defining the access condition CA1 and not using the control word CW1 (the bursts of m packets being uncoded). This amounts to exerting no control on the reception of the elementary flow and offering all receivers access to the degraded picture or sound.

We claim:

1. A method for broadcasting programs with progressive conditional access, comprising the steps of:

breaking an information flow of a program into a first flow and a second flow, said breaking step comprising,
  arranging said first flow into a channel of order i in groups of m successive fixed length frames, said fixed length frames comprising variable length channels arranged in plural orders,
  arranging said second flow into the channel of order i in groups of p successive fixed length frames;
scrambling the second flow with a control word; and
transmitting an entitlement checking message with said program so that a receiver equipped with an access right may descramble and restore the information flow, reception of the first flow resulting in a partially discernable program and reception of said second flow, once descrambled, resulting in complete restoration of the program, said transmitting step comprising the steps of,
  transmitting said program in said channel of order i, and
  multiplexing said groups of m successive fixed length frames alternately with said groups of p successive fixed length frames.

2. The process according to claim 1, wherein said scrambling step comprises the steps of:

scrambling the groups of m successive fixed length frames of said first flow by another control word; and
scrambling the groups of p successive fixed length frames of the second flow by the control word.

3. The process according to claim 2, wherein said step of scrambling the groups of m successive fixed length frames comprises scrambling the groups of m successive fixed length frames with the another control word which comprises at least one of a known control word of the receiver and a transmitted control word that is conveyed within the entitlement checking message.

4. The process according to claim 1, wherein said step of transmitting an entitlement checking message comprises:

transmitting said said program in a channel of order i of said variable length channels, where said groups of m successive fixed length frames of said first flow comprise m unscrambled frames and said p successive elements of said second flow comprise p scrambled frames.

5. The process according to claim 2 or 4, wherein said step of transmitting an entitlement checking message comprises the steps of:

transmitting numbers corresponding to respective values of m and of p; and transmitting indicia regarding which of said groups of m successive fixed length frames and said group of p successive fixed length frames is a first scrambled frame and which of said control word and said another control word scrambled the first scrambled frame.

6. A method for broadcasting programs with progressive conditional access, comprising the steps of:

breaking an information flow of a program into a first flow and a second flow, said breaking step comprising,
    arranging said first flow into a channel of order i in groups of m successive packets, and
    arranging said second flow into the channel of order i in groups of p successive packets;
scrambling the second flow with a control word; and
transmitting an entitlement checking message with said program so that a receiver equipped with an access right may descramble and restore the information flow, reception of the first flow resulting in a partially discernable program and reception said second flow, once descrambled, resulting in complete restoration of the program, said transmitting step comprising,
    multiplexing said groups of m successive packets alternately with said groups of p successive packets.

7. The method according to claim 6, wherein said scrambling step comprises scrambling said groups of m successive packets by another control word.

8. The method according to claim 7, wherein said step of scrambling said groups of m successive packets comprises scrambling with the another control, where said another control word comprises at least one of a known control word of the receiver and a transmitted control word conveyed within the entitlement checking message.

9. The method according to claim 6, wherein said step of transmitting comprises:

transmitting said group of m successive packets as unscrambled packets and said group of p successive packets as scrambled packets.

10. The method according to claim 7 or claim 9, wherein said breaking step comprises,
    arranging said first flow into a channel of order i in groups of said m successive packets, each packet comprising a header, and
    arranging said second flow into the channel of order i in groups of said p successive packets, each packet comprising the header; and
said transmitting step comprising,
    transmitting indicia regarding which of said control word and said another control word is transmitted in the header of respective of said m successive packets and said p successive packets.

11. The method according to claim 6, wherein:

said step of arranging said first flow into the channel of order i in groups of m successive packets comprises arranging said first flow where m is a variable; and
said step of arranging said second flow into the channel of order i in groups of p successive packets comprises arranging said second flow where p is a variable.

12. The method of claim 2, wherein:

said scrambling step comprises scrambling with said another control word and said control word, said another control word and said control word having respective limited phases;
said multiplexing step comprises alternately multiplexing said groups of m successive fixed length frames and said p successive fixed length frames with an even phase and an odd phase;
said step of transmitting an entitlement checking message comprises transmitting at least one of said control word and said another control word as a current control word of a current phase and a future control word of a following phase, one of said current word and said future control word being called an even word used during an even phase and the other of being called an odd word used during an odd phase, comprising,
    changing respective parities of the another control word and the control word at a same time,
    using the even word and the odd word relative to the control word,
    using the even and odd words relative to the another control word, and
    transmitting a parity information about the even and odd words used.

13. The method of claim 7, wherein:

said scrambling step comprises scrambling with said another control word and said control word, said another control word and said control word having respective limited phases;
said multiplexing step comprises alternately multiplexing said groups of m successive packets and said p successive packets with an even phase and an odd phase;
said step of transmitting an entitlement checking message comprises transmitting at least one of said control word and said another control word as a current control word of a current phase and a future control word of a following phase, one of said current word and said future control word being called an even word used during an even phase and the other of being called an odd word used during an odd phase, comprising,
    changing respective parities of the another control word and the control word at a same time,
    using the even and odd words relative to the control word,
    using the even and odd words relative to the another control word, and
    transmitting a parity information about the even and odd words used.

14. A receiver for receiving programs transmitted with progressive conditional access, comprising:

means for subdividing a transmitted information flow into a first flow of m successive elements and a second flow of p successive elements, the respective groups of m successive elements alternating with the groups of p successive elements;

means for recognizing at least one entitlement checking message in the transmitted information flow and for extracting therefrom at least one control word and at least one access condition;

means for checking if said at least said one access condition is satisfied by said receiver;

means for descrambling at least the second information flow using said at least one control word if the at least one of said access condition is satisfied as checked by said means for checking; and at least one of a video, an audio and a data receiver configured to receive at least the second flow of p successive elements and a descrambled complimentary flow corresponding to said second flow of p successive elements if the access condition is satisfied.

15. The receiver according to claim 14, wherein:

said means for recognizing the at least one entitlement checking message comprises means for recognizing two entitlement checking messages and restoring two control words and two access conditions;

said means for checking if said at least one access condition is satisfied comprises means for checking if the two access conditions are satisfied; and said means for descrambling at least the second information flow comprises means for descrambling the first information flow based on the first control word.

16. The receiver according to claim 14, wherein:

said means for recognizing at least one entitlement checking message comprising means for recognizing a single entitlement checking message and restoring a single control word and a single access condition;

said means for checking if at least one access condition is satisfied checks only whether one of said at least one access condition is satisfied; and said means for descrambling at least the second information flow solely descrambles the second information flow using a single restored control word of the at least one control word.

17. The receiver according to claim 16, wherein the means for descrambling at least the second information flow comprises means for descrambling the first information flow based on a known control word of the receiver.

18. The receiver according to claim 14, wherein:

said means for recognizing at least one entitlement checking message comprises means for extracting four control words comprising first and second even words and first and second odd words; and the receiver further comprises,
    a parity memory with at least one bit, and
    means for recognizing a state of a group of two received bits.

19. The receiver as in one of the claims 14–18 wherein said at least one of a video, an audio, and a data receiver receives both descrambled signals and scrambled signals.

20. The receiver as in one of the claims 14–18, wherein said at least one of a video, an audio, and data receiver only receives descrambled signals.

* * * * *